(12) United States Patent
Maeda (10) Patent No.: US 8,205,731 B2
(45) Date of Patent: Jun. 26, 2012

(54) LOCKUP DEVICE, AND FLUID-TYPE TORQUE TRANSMISSION DEVICE EQUIPPED WITH SAME

(75) Inventor: Masahiro Maeda, Yamatokooriyama (JP)

(73) Assignee: EXEDY Corporation, Osaka (JP)

( * ) Notice: Subject to any disclaimer, the term of this patent is extended or adjusted under 35 U.S.C. 154(b) by 736 days.

(21) Appl. No.: 12/233,267

(22) Filed: Sep. 18, 2008

(65) Prior Publication Data
US 2009/0095589 A1 Apr. 16, 2009

(30) Foreign Application Priority Data
Oct. 10, 2007 (JP) ................................ 2007-264815

(51) Int. Cl.
*F16H 45/02* (2006.01)
(52) U.S. Cl. .................................. 192/3.29; 192/213.2
(58) Field of Classification Search ................. 192/3.29, 192/3.3, 213.2–213.22; 464/68.8, 68.1, 68.3, 464/68.4, 64.1
See application file for complete search history.

(56) References Cited

U.S. PATENT DOCUMENTS

| | | | | |
|---|---|---|---|---|
| 4,559,024 A * | 12/1985 | Tamura et al. | ............... | 464/68.4 |
| 5,020,647 A * | 6/1991 | Fujimoto et al. | ............. | 192/3.29 |
| 5,279,398 A * | 1/1994 | Graton et al. | ................. | 192/3.29 |
| 5,752,884 A * | 5/1998 | Yabe et al. | .................... | 464/68.3 |
| 5,810,140 A * | 9/1998 | Billet et al. | ................... | 192/3.29 |
| 5,813,506 A * | 9/1998 | Maeda et al. | ................. | 192/3.29 |
| 6,068,096 A * | 5/2000 | Morita | ........................ | 192/3.29 |
| 6,224,487 B1 * | 5/2001 | Yuergens | ................. | 464/68.8 X |
| 6,571,929 B2 * | 6/2003 | Tomiyama et al. | ........ | 192/213.1 |
| 6,595,335 B2 * | 7/2003 | Schroder | ...................... | 192/3.29 |
| 7,073,646 B2 * | 7/2006 | Sasse et al. | ................... | 192/3.29 |
| 7,083,029 B2 * | 8/2006 | Seebacher et al. | ........... | 192/3.29 |
| 7,108,112 B2 * | 9/2006 | Mizukami | .................... | 192/3.29 |
| 7,322,454 B2 * | 1/2008 | Sato et al. | .................... | 192/3.29 |
| 7,648,009 B2 * | 1/2010 | Wack et al. | ................... | 192/3.29 |
| 7,658,679 B2 * | 2/2010 | Avins et al. | .................. | 464/68.1 |
| 2001/0008198 A1 * | 7/2001 | Maienschein et al. | ........ | 192/3.29 |
| 2002/0066631 A1 * | 6/2002 | Kietlinski et al. | ........... | 192/3.29 |
| 2003/0032487 A1 * | 2/2003 | Verhoog et al. | .......... | 192/3.29 X |
| 2004/0185940 A1 * | 9/2004 | Yamamoto et al. | | |
| 2005/0115788 A1 * | 6/2005 | Ackermann et al. | ......... | 192/3.29 |
| 2007/0251791 A1 * | 11/2007 | Fujiwara et al. | ............. | 192/3.29 |
| 2008/0029359 A1 * | 2/2008 | Takada et al. | ................ | 192/3.29 |
| 2008/0257675 A1 * | 10/2008 | Sasse et al. | ................... | 192/3.29 |
| 2009/0183962 A1 * | 7/2009 | Nakamura | ................... | 192/3.29 |

FOREIGN PATENT DOCUMENTS

| | | |
|---|---|---|
| JP | H09-072399 | 3/1997 |
| JP | 3752404 B | 3/2001 |

* cited by examiner

*Primary Examiner* — Gregory Binda
*Assistant Examiner* — Matthieu Setliff
(74) *Attorney, Agent, or Firm* — Global IP Counselors, LLP (57) ABSTRACT

A lockup device 5 of a torque converter 1 has a piston 51, a first plate 61, a second plate 62, a intermediate plate 63, a plurality of first springs 64, and a plurality of second springs 65. The intermediate plate 63 is provided so as to be able to rotate with respect to the piston 51 within a specific angular range. The second springs 65 are disposed more to the outside in the radial direction than the first springs 64 so as to act in series with the first springs 64 via the intermediate plate 63, and are supported by the intermediate plate 63 so as to be elastically deformable in the rotation direction. The driven plate 68 has prongs 68a that can come into contact with the ends of the second springs 65, and is fixed to the outer peripheral part of the turbine 4.

16 Claims, 5 Drawing Sheets

LOCKUP DEVICE, AND FLUID-TYPE TORQUE TRANSMISSION DEVICE EQUIPPED WITH SAME

CROSS-REFERENCE TO RELATED APPLICATIONS

This application claims priority to Japanese Patent Application No. 2007-264815 filed on Oct. 10, 2007. The entire disclosure of Japanese Patent Application No. 2007-264815 is hereby incorporated herein by reference.

BACKGROUND OF THE INVENTION

1. Field of the Invention

The present invention relates to a lockup device for a fluid-type torque transmission device, and more particularly relates to a lockup device having a plurality of friction faces.

2. Background Information

A torque converter is a known fluid-type torque transmission device. A torque converter has three kinds of bladed wheels (an impeller, a turbine, and a stator) in its interior, and transmits torque via hydraulic fluid in its interior. Such torque converters are usually equipped with a lockup device.

A lockup device is disposed in the space between the turbine and a front cover in a fluid chamber formed by the turbine and the front cover, and is a mechanism for directly transmitting torque from the front cover to the turbine by mechanically linking the front cover and the turbine.

This lockup device usually has a disk-shaped piston and a damper mechanism that elastically links the piston and the turbine in the rotation direction. The damper mechanism has a retaining plate fixed to the piston, a first spring supported by the retaining plate, a pair of intermediate plates rotatably provided with respect to the piston, a second spring supported by the pair of intermediate plates so as to act in series with the first spring, and a driven plate fixed to the turbine (see, for example, Japanese Patent No. 3,752,404).

When the lockup device is engaged, a change in hydraulic pressure moves the piston to the front cover side, and the piston slides with the front cover. As a result, torque is transmitted from the front cover to a friction plate, and is then transmitted through the damper mechanism to the turbine.

Meanwhile, when the lockup device is disengaged, a change in hydraulic pressure moves the piston to the turbine side, and the piston is able to rotate with respect to the front cover. As a result, torque does not go through the lockup device, and is instead transmitted through the fluid from the impeller to the turbine.

With this lockup device, the second spring is supported by the pair of intermediate plates. The pair of intermediate plates and the second spring is disposed in the axial direction between the turbine and the piston, and the driven plate fixed to the turbine is disposed in the axial direction between the pair of intermediate plates. Therefore, a conventional lockup device tends to be large in the axial direction.

In view of the above, it will be apparent to those skilled in the art from this disclosure that there exists a need for an improved lockup device, and fluid-type torque transmission device having the lockup device. This invention addresses this need in the art as well as other needs, which will become apparent to those skilled in the art from this disclosure.

SUMMARY OF THE INVENTION

It is an object of the present invention to reduce the size of a lockup device used in a fluid-type torque transmission device.

A lockup device according to a first aspect of the present invention is used in a fluid-type torque transmission device and is disposed between a front cover and a turbine. This lockup device includes a piston, a first plate, an intermediate plate, a first elastic member, a second elastic member, and a driven member. The piston is provided movably in the axial direction and rotatably with respect to the front cover. The first plate is fixed to the piston. The intermediate plate is provided so as to be rotatable with respect to the piston within a specific angular range. The first elastic member is supported by the first plate so as to be elastically deformable in the rotation direction. The second elastic member is disposed more to the outside in the radial direction than, i.e., disposed radially outside, the first elastic member so as to act in series with the first elastic member via the intermediate plate, and is supported by the intermediate plate so as to be elastically deformable in the rotation direction. The driven member has a prong which can come into contact with the end of the second elastic member, and is fixed to the outer peripheral part of the turbine.

With this lockup device, when the piston is pressed against the front cover, torque is transmitted to the piston, and the piston rotates with respect to the turbine. At this point the piston and the first plate rotate integrally, and the first and second elastic members are compressed in series in the rotation direction between the first plate and the driven member via the intermediate plate.

In this case, torque is transmitted to the turbine from the second elastic member disposed to the outside in the radial direction of the first elastic member. Therefore, compared to a configuration in which the driven member is fixed to the inner peripheral part of the turbine, the size is reduced in the axial direction of the lockup device. This makes it possible for the lockup device to be more compact.

The phrase "to the outside in the radial direction" here means that the position in the radial direction is disposed to the outside, regardless of the position in the rotation direction.

A lockup device according to a second aspect of the present invention is the lockup device according to the first aspect, further including a first fixing member that is disposed more to the outside in the radial direction than, i.e., disposed radially outside, the first elastic member, and that fixes the outer peripheral part of the first plate to the piston.

A lockup device according to a third aspect of the present invention is the lockup device according to the first or second aspect, further including a second plate that is disposed in the axial direction between the piston and the intermediate plate, and that is fixed to the piston. The first elastic member is supported by the first and second plates so as to be elastically deformable in the rotation direction.

A lockup device according to a fourth aspect of the present invention is the lockup device according to the third aspect, further including a second fixing member that is disposed more to the inside in the radial direction than, i.e., radially inside, the first elastic member, and that links the first and second plates.

A lockup device according to a fifth aspect of the present invention is the lockup device according to the fourth aspect, wherein the intermediate plate has a pair of contact components that are portions configured to contact with the second fixing member in the rotation direction, and that limit the rotational angle of the intermediate plate with respect to the piston to within the specific angular range.

A lockup device according to a sixth aspect of the present invention is the lockup device according to the fifth aspect, wherein the intermediate plate is supported in the radial direction by the first plate via the second fixing member.

A lockup device according to a seventh aspect of the present invention is the lockup device according to any of the first to sixth aspects, wherein the intermediate plate is supported in the radial direction by coming into contact with the piston.

A fluid-type torque transmission device according to an eighth aspect of the present invention is a device that transmits torque outputted from an engine to a transmission. This fluid-type torque transmission device includes a front cover to which torque is inputted, an impeller, a turbine, and the lockup device according to any of the first to seventh aspects. The impeller is fixed to the front cover and forms along with the front cover a fluid chamber filled with a hydraulic fluid. The turbine is disposed in the fluid chamber.

This fluid-type torque transmission device can be made more compact because it has the lockup device according to any of the first to seventh aspects.

Here, the term "fluid-type torque transmission device" encompasses devices that transmit torque via a fluid, such as a torque converter and a fluid coupling.

Due to the above described constitution, the lockup device and fluid-type torque transmission device according to the present invention can be made more compact.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
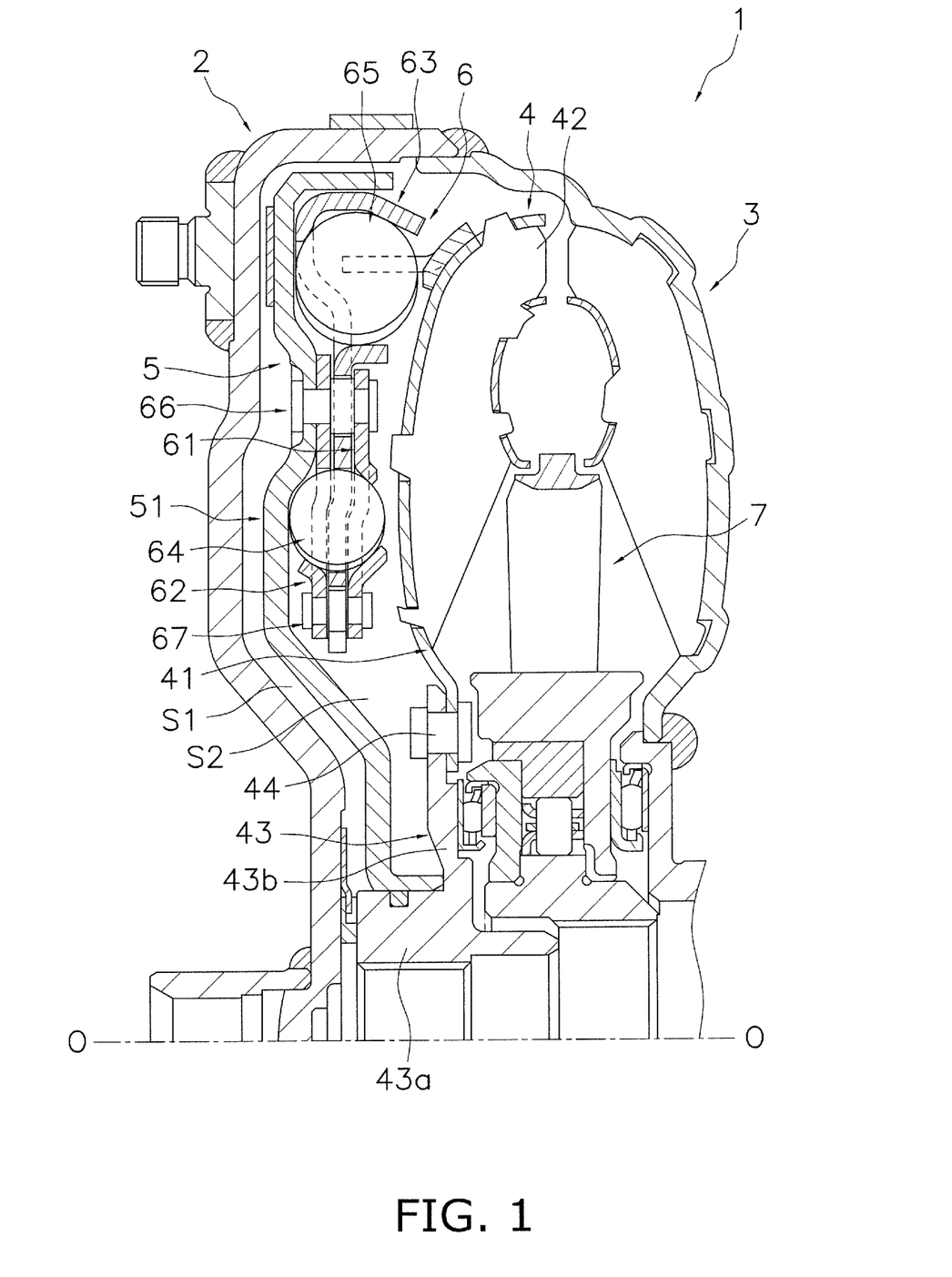
FIG. 1 is a simplified vertical cross-sectional view of a torque converter according to a first preferred embodiment of the present invention.
Figure 2:
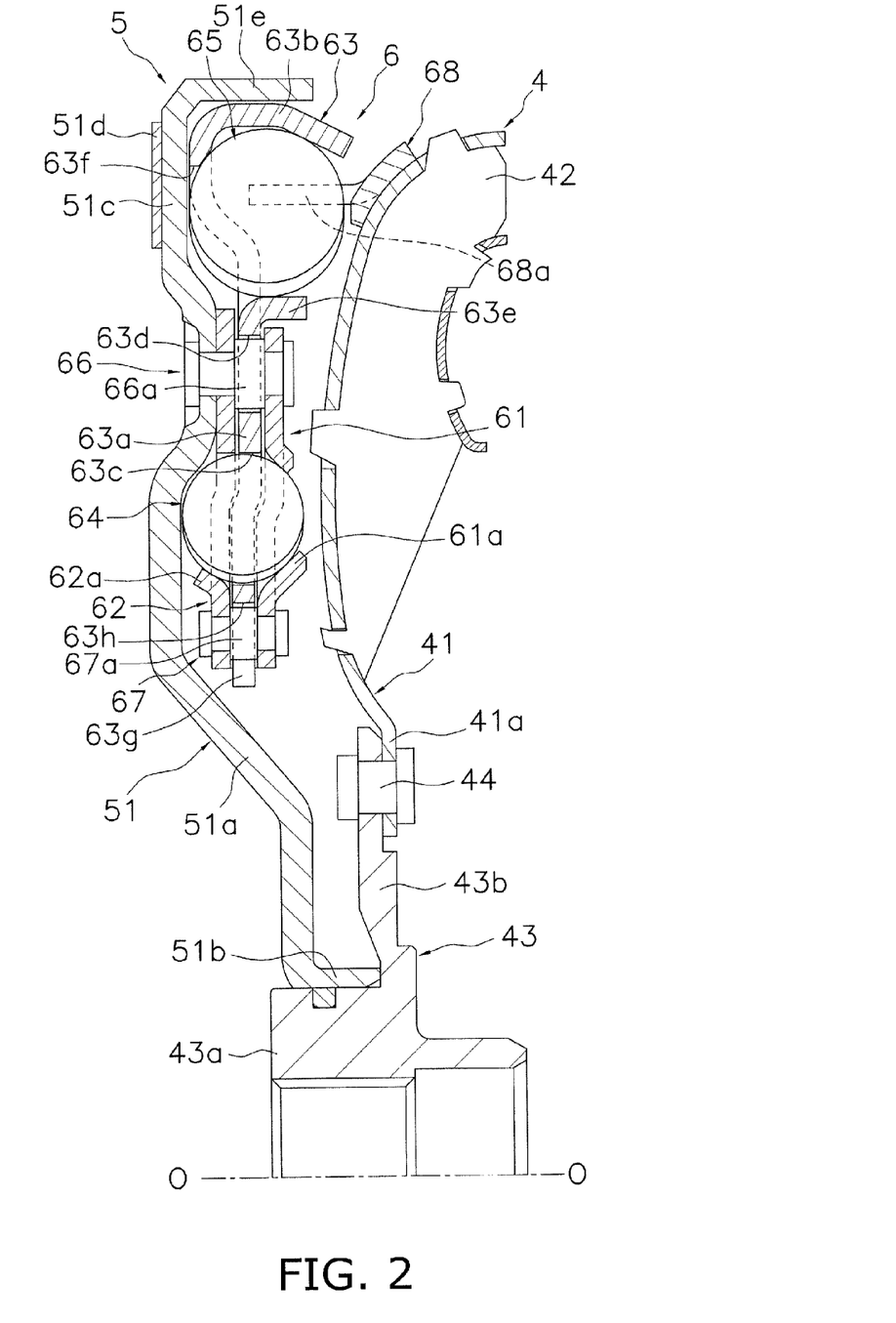
FIG. 2 is a simplified vertical cross-sectional view of a lockup device of the torque converter.
Figure 3:
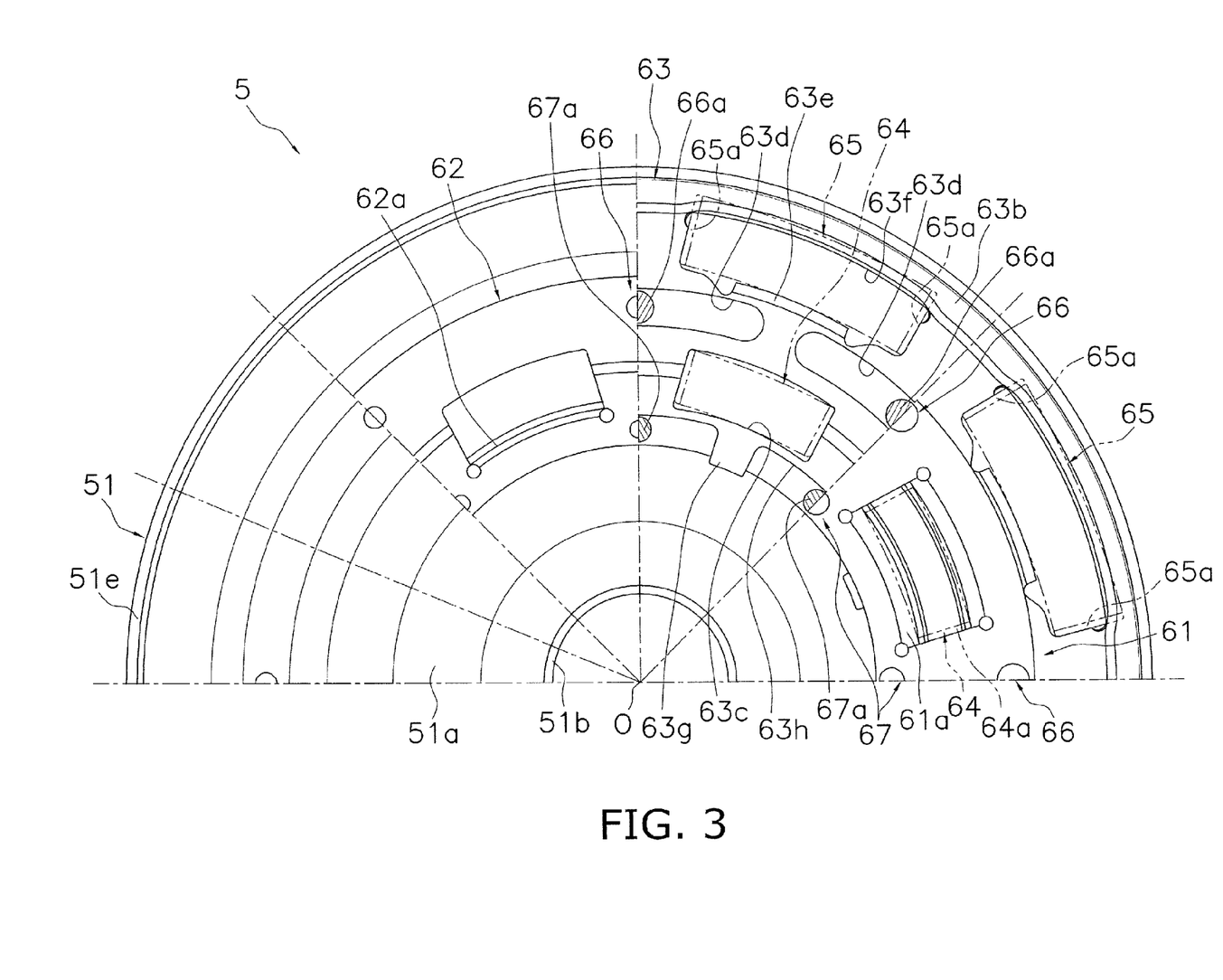
FIG. 3 is a partial elevational view of the lockup device.

Embodiments of the present invention will now be described through reference to the drawings.
First Embodiment
Overall Configuration of Torque Converter The overall configuration of a torque converter 1 according to a first preferred embodiment will be described through reference to FIGS. 1 to 3. FIG. 1 is a simplified vertical cross-sectional view of the torque converter 1. FIG. 2 is a simplified vertical cross-sectional view of a lockup device 5 of the torque converter 1. FIG. 3 is an elevational view of the lockup device 5. An engine (not shown) is disposed on the left side in FIG. 1, and a transmission (not shown) is disposed on the right side in FIG. 1. The O-O line shown in FIG. 1 is the rotational axis of the torque converter 1.

The torque converter 1 is a device for transmitting torque outputted from the engine to an input shaft (not shown) of the transmission.

More specifically, as shown in FIG. 1, the torque converter 1 mainly includes a front cover 2 (as an input-side member), an impeller 3 fixed to the front cover 2, a turbine 4 (as an output-side member), a stator 7, and the lockup device 5, which is configured to link mechanically the front cover 2 and the turbine 4.

The front cover 2 is linked with a crankshaft (not shown) of the engine. The impeller 3 forms along with the front cover 2 a fluid chamber filled with hydraulic fluid.

The turbine 4 is a member to which the torque inputted to the front cover 2 is transmitted via the hydraulic fluid, and is linked to the input shaft (not shown) of the transmission. The turbine 4 has a turbine shell 41, a plurality of turbine blades 42 fixed to the turbine shell 41, and a turbine hub 43 to which the turbine shell 41 is fixed. The turbine hub 43 has a cylindrical component 43a that is splined to an input shaft, and an annular flange 43b that extends outward in the radial direction from the cylindrical component 43a. An inner peripheral part 41a of the turbine shell 41 is fixed by a plurality of rivets 44 to the flange 43b.
Configuration of Lockup Device As shown in FIGS. 1 to 3, the lockup device 5 is disposed in the axial direction between the front cover 2 and the turbine 4, and mainly includes a piston 51 and a damper mechanism 6.

(1) Piston

The piston 51 is a member that performs the clutch function of the lockup device 5, and is provided rotatably with respect to the front cover 2 and the turbine 4 and movably in the axial direction. More specifically, the piston 51 has an annular piston main body 51a, an inner peripheral cylindrical component 51b that extends in the axial direction from the inner peripheral part of the piston main body 51a to the transmission side, and an outer peripheral cylindrical component 51e that extends in the axial direction from the outer peripheral part of the piston main body 51a to the transmission side. Since the cylindrical component 43a of the turbine hub 43 mates with the inner peripheral cylindrical component 51b, the piston 51 is supported by the turbine hub 43 so as to be able to move in the axial direction and to rotate relatively thereto.

The piston main body 51a has a shape that substantially conforms to that of the front cover 2, and substantially divides the space between the front cover 2 and the turbine 4 in the axial direction. As shown in FIG. 1, an annular first space S1 is formed in the axial direction between the front cover 2 and the piston 51. An annular second space S2 is formed in the axial direction between the piston 51 and the turbine 4.

A disk-shaped sliding component 51c is formed at the outer peripheral part of the piston main body 51a. An annular friction facing 51d that slides with the front cover 2 is fixed on the engine side of the sliding component 51c. The damper mechanism 6 is provided on the transmission side of the piston main body 51a and on the inner peripheral side of the outer peripheral cylindrical component 51e.

(2) Damper Mechanism

The damper mechanism 6 is a mechanism that elastically links the piston 51 and the turbine 4 in the rotation direction, and is supported by the piston 51. More specifically, the damper mechanism 6 has a first plate 61, a second plate 62, an intermediate plate 63, a plurality of first springs 64 (as a first elastic member), and a plurality of second springs 65 (as a second elastic member) disposed more to the outside in the radial direction than, i.e., disposed radially outside, the first springs 64. The first springs 64 and second springs 65 are linked by the intermediate plate 63 so as to act in series. Here, for example, the damper mechanism 6 has a single-stage characteristic such that the first springs 64 and the second springs 65 act in series.

The phrase "to the outside in the radial direction" here means that the position in the radial direction is disposed to the outside, regardless of the position in the rotation direction, and "to the inside in the radial direction" means that the position in the radial direction is disposed to the inside, regardless of the position in the rotation direction.

The first plate 61 and the second plate 62 are members that support the first springs 64 so as to be elastically deformable in the rotation direction, and are fixed to the piston 51 by a plurality of first pins 66 (first fixing member). The first plate 61 has a plurality of first accommodation components 61a disposed in a row in the rotation direction. The second plate 62 has a plurality of second accommodation components 62a disposed in locations corresponding to the first accommodation components 61a. The first springs 64 are supported by the first accommodation components 61a and second accommodation components 62a so as to be elastically deformable in the rotation direction.

The edges of the first accommodation components 61a on the inner and outer sides in the radial direction are bent to the transmission side, conforming to the shape of the first springs 64. The edges of the second accommodation components 62a on the inner side in the radial direction are bent to the engine side, conforming to the shape of the first springs 64. The first springs 64 are disposed in the axial direction between the first accommodation components 61a and the second accommodation components 62a. The edges of the first accommodation components 61a and second accommodation components 62a in the rotation direction are opposite the ends of the first springs 64 (more precisely, a pair of first spring seats 64a mounted at the ends of the first springs 64), either touching in the rotation direction or with a slight gap in between. Movement of the first springs 64 in the rotation direction and the radial direction is limited by the first accommodation components 61a and the second accommodation components 62a.

The first pins 66 each have a large-diameter, cylindrical first intermediate component 66a near the middle in the axial direction, and the first intermediate components 66a are sandwiched between the first plate 61 and the second plate 62 in the axial direction. The first pins 66 are disposed more to the outside in the radial direction than the first springs 64, and are disposed more to the inside in the radial direction than the second springs 65.

The inner peripheral parts of the first plate 61 and the second plate 62 are linked by a plurality of second pins 67 (second fixing member). The second pins 67, just as with the first pins 66, each have a large-diameter, cylindrical second intermediate component 67a near the middle in the axial direction, and the second intermediate components 67a are sandwiched between the first plate 61 and the second plate 62 in the axial direction. The second pins 67 are disposed more to the inside in the radial direction than the first springs 64.

As shown in FIG. 2, the first intermediate components 66a and the second intermediate components 67a maintain a gap in the axial direction between the first plate 61 and the second plate 62. The intermediate plate 63 is disposed in the axial direction between the first plate 61 and the second plate 62.

The intermediate plate 63 is an annular member that links the first springs 64 and the second springs 65 in series, and is provided so as to be configured to rotate within a specific angular range with respect to the piston 51, the first plate 61, and the second plate 62. Movement of the intermediate plate 63 in the axial direction is limited by the first plate 61 and the second plate 62.

As shown in FIG. 2, the intermediate plate 63 has an intermediate plate main body 63a and an annular outer peripheral support component 63b that extends from the outer peripheral part of the intermediate plate main body 63a to the transmission side. Openings 63f disposed at an equal pitch in the rotation direction are formed in the outer peripheral part of the intermediate plate main body 63a. Inner peripheral support components 63e that extend to the transmission side are formed on the inside of the openings 63f in the radial direction. Part of the second springs 65 are disposed in the openings 63f, and the second springs 65 come into contact with the sliding component 51c of the piston 51 in the axial direction.

The edges of the openings 63f in the rotation direction are opposite the ends of the second springs 65 (more precisely, a pair of second spring seats 65a mounted at the ends of the second springs 65), either touching in the rotation direction or with a slight gap in between. The second springs 65 are disposed in the radial direction between the outer peripheral support component 63b and the inner peripheral support components 63e, and movement of the second springs 65 in the axial direction and the radial direction is limited by the outer peripheral support component 63b and the inner peripheral support components 63e.

Thus, the first springs 64 are supported by the intermediate plate 63 so as to be elastically deformable in the rotation direction.

A plurality of arc-shaped slots 63d extending in the rotation direction is formed around the middle part of the intermediate plate main body 63a in the radial direction. The first intermediate components 66a of the first pins 66 are inserted in the slots 63d. A gap is maintained between the edges of the slots 63d and the first intermediate components 66a so that the first intermediate components 66a will not touch the slots 63d even if the intermediate plate 63 relatively moves with respect to the first pins 66 in the rotation direction.

A plurality of openings 63c disposed at an equal pitch in the rotation direction is formed more to the inside in the radial direction than the slots 63d of the intermediate plate main body 63a. The first springs 64 are accommodated in the openings 63c. The edges of the openings 63c in the rotation direction are opposite the ends of the first springs 64, either touching in the rotation direction or with a slight gap in between.

The intermediate plate 63 has a plurality of protrusions 63g as contact components. The protrusions 63g extend to the inside in the radial direction from the inner peripheral part of the intermediate plate main body 63a. The second intermediate components 67a of the second pins 67 are disposed in the rotation direction between the protrusions 63g. The protrusions 63g and the second intermediate components 67a are able to come into contact in the rotation direction. The rotational angle of the intermediate plate 63 with respect to the piston 51, the first plate 61, and the second plate 62 is limited to a specific angular range. When the second pins 67 are in contact with the protrusions 63g, a gap is maintained in the rotation direction between the first pins 66 and the edges of the slots 63d.

The inner peripheral face 63h of the intermediate plate main body 63a and the second intermediate components 67a of the second pins 67 are able to come into contact in the radial direction. That is, the intermediate plate 63 is supported in the radial direction by the first plate 61 and the second plate 62 via the second pins 67.

An annular driven plate (driven member) 68 is fixed to the outer peripheral part of the turbine 4. The driven plate 68 has a plurality of prongs 68a that are disposed at an equal pitch in the rotation direction and extend to the engine side. The prongs 68a are inserted between adjacent second spring seats 65a, and are able to come into contact with the second spring seats 65a in the rotation direction.

Operation of Torque Converter

The operation of the torque converter 1 will be described with reference to FIGS. 1 and 2.

When the front cover 2 and the turbine 4 are linked by the lockup device 5, the hydraulic fluid in the first space S1 is discharged. As a result, the pressure of the second space S2 becomes higher than the pressure of the first space S1, and this pressure differential causes the piston 51 to move to the front cover 2 side. This causes the friction facing 51d of the piston 51 to slide with the front cover 2, the frictional force links the piston 51 to the front cover 2, and power is transmitted to the piston 51. Furthermore, the power transmitted to the piston 51 is transmitted through the damper mechanism 6 to the turbine 4.

At this point, since the piston 51 is rotating with respect to the turbine 4, the first springs 64 and the second springs 65 are compressed in series in the rotation direction between the piston 51 and the turbine 4. More specifically, they are compressed in the rotation direction between the edges of the first accommodation components 61a and the second accommodation components 62a and the edges of the openings 63c in the intermediate plate 63 in a state in which the first springs 64 are supported by the first plate 61 and the second plate 62. Simultaneously with this, the second springs 65 are compressed in series with the first springs 64 in the rotation direction between the edges of the openings 63f in the intermediate plate 63 and the prongs 68a of the driven plate 68. This allows any torsional vibration generated during the operation of the lockup device 5 and any torsional vibration transmitted from the engine to be absorbed and attenuated by the damper mechanism 6.

Meanwhile, when the lockup device 5 is disengaged, hydraulic fluid is supplied from a hydraulic pump (not shown) to the first space S1. As a result, the pressure in the first space S1 is either the same as the pressure in the second space S2, or higher than the pressure in the second space S2, and the pressing force against the piston 51 is released. This allows the piston 51 to rotate with respect to the front cover 2, the transmission of torque through the lockup device 5 is interrupted, and torque is instead transmitted through the hydraulic fluid.

Features

The lockup device 5 has the following features.

(1) With the lockup device 5, torque is transmitted to the turbine 4 from the second springs 65 disposed to the outside in the radial direction of the first springs 64. Therefore, compared to a configuration in which the driven plate 68 is fixed in the interior of the turbine 4, the size of the lockup device 5 can be reduced in the axial direction. This makes it possible for the lockup device 5 to be more compact.

(2) With the lockup device 5, since the outer peripheral part of the first plate 61 is fixed to the piston 51 by the first pins 66, the outer peripheral part of the first plate 61 can be prevented from separating from the piston 51 by the first pins 66 even if the first springs 64 should move to the outside in the radial direction under centrifugal force. This stabilizes the compression operation of the first springs 64 and also stabilizes the operation of the lockup device 5.

(3) With the lockup device 5, since the first springs 64 are supported by the first plate 61 and the second plate 62, the first springs 64 can be prevented from sliding with the piston 51, which prevents wear of the piston 51.

(4) With the lockup device 5, since the first plate 61 and the second plate 62 are linked by the second pins 67, the first plate 61 and the second plate 62 are prevented from undergoing elastic deformation in the direction of moving away from each other under centrifugal force. This further stabilizes the compression operation of the first springs 64 and also further stabilizes the operation of the lockup device 5.

(5) With the lockup device 5, since the rotation angle of the intermediate plate 63 with respect to the piston 51 is limited by the second pins 67 and the protrusions 63g, a stopper mechanism for the lockup device 5 can be realized by a simple structure.

(6) With the lockup device 5, since the intermediate plate 63 is supported in the radial direction by the first plate 61 via the second pins 67 disposed more to the inside in the radial direction than the first springs 64, the sliding distance between the intermediate plate 63 and the second pins 67 can be shortened, and the intermediate plate 63 can be supported in the radial direction while an increase in the rotational resistance of the intermediate plate 63 can be suppressed.

(7) Thus, this torque converter 1 can be more compact because the lockup device 5 is employed.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Second Embodiment

In the first embodiment, the first springs 64 were supported by the first plate 61 and the second plate 62, but the embodiment given below is also possible. A lockup device 105 pertaining to a second embodiment will be described through reference to FIGS. 4 and 5.

Configurations and portions having substantially the same function as in the first embodiment will be numbered the same, and will not be described in detail again.

Configuration of Lockup Device

Figure 4:
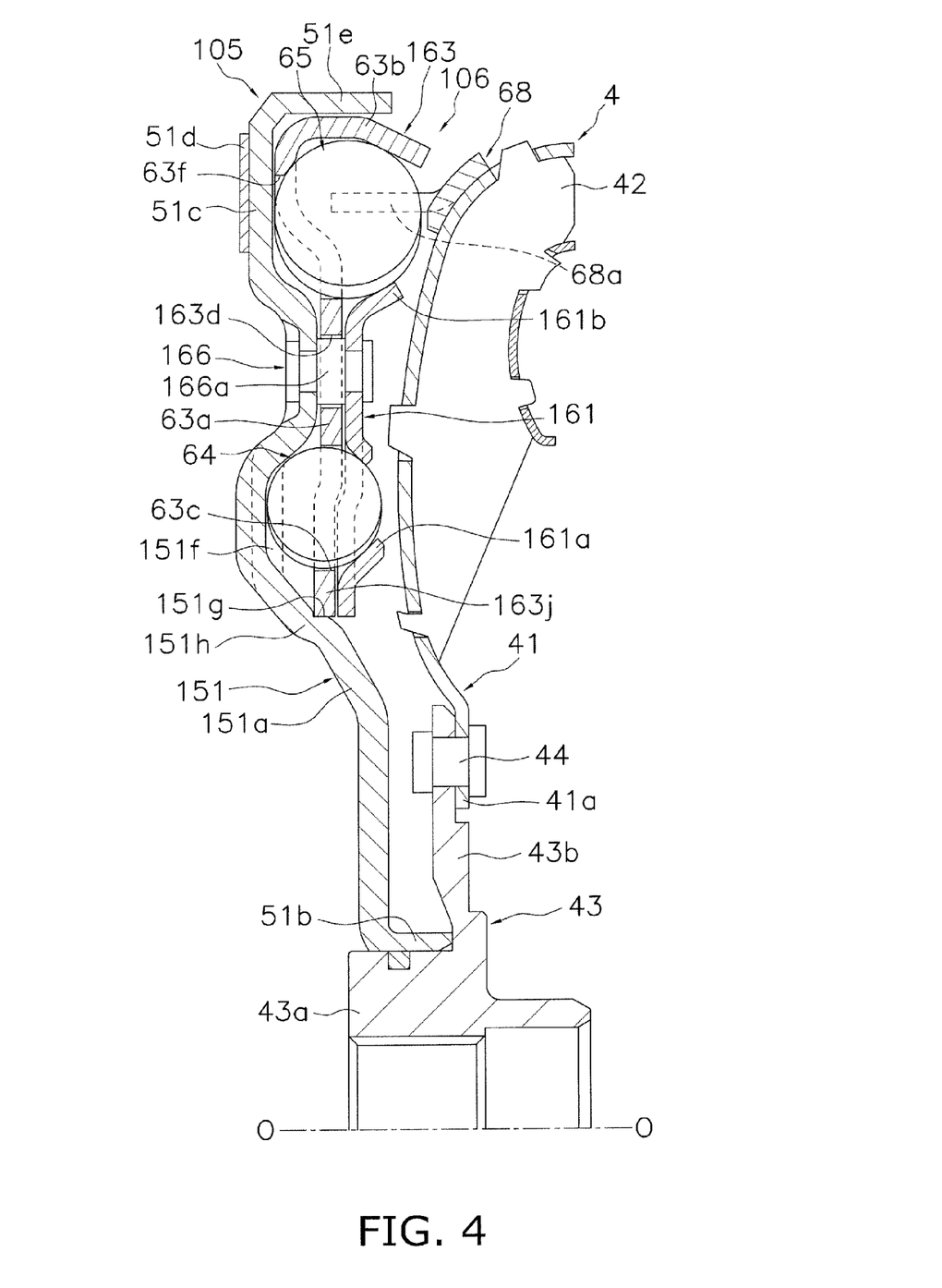
FIG. 4 is a simplified vertical cross-sectional view of a lockup device according to a second preferred embodiment of the present invention.
Figure 5:
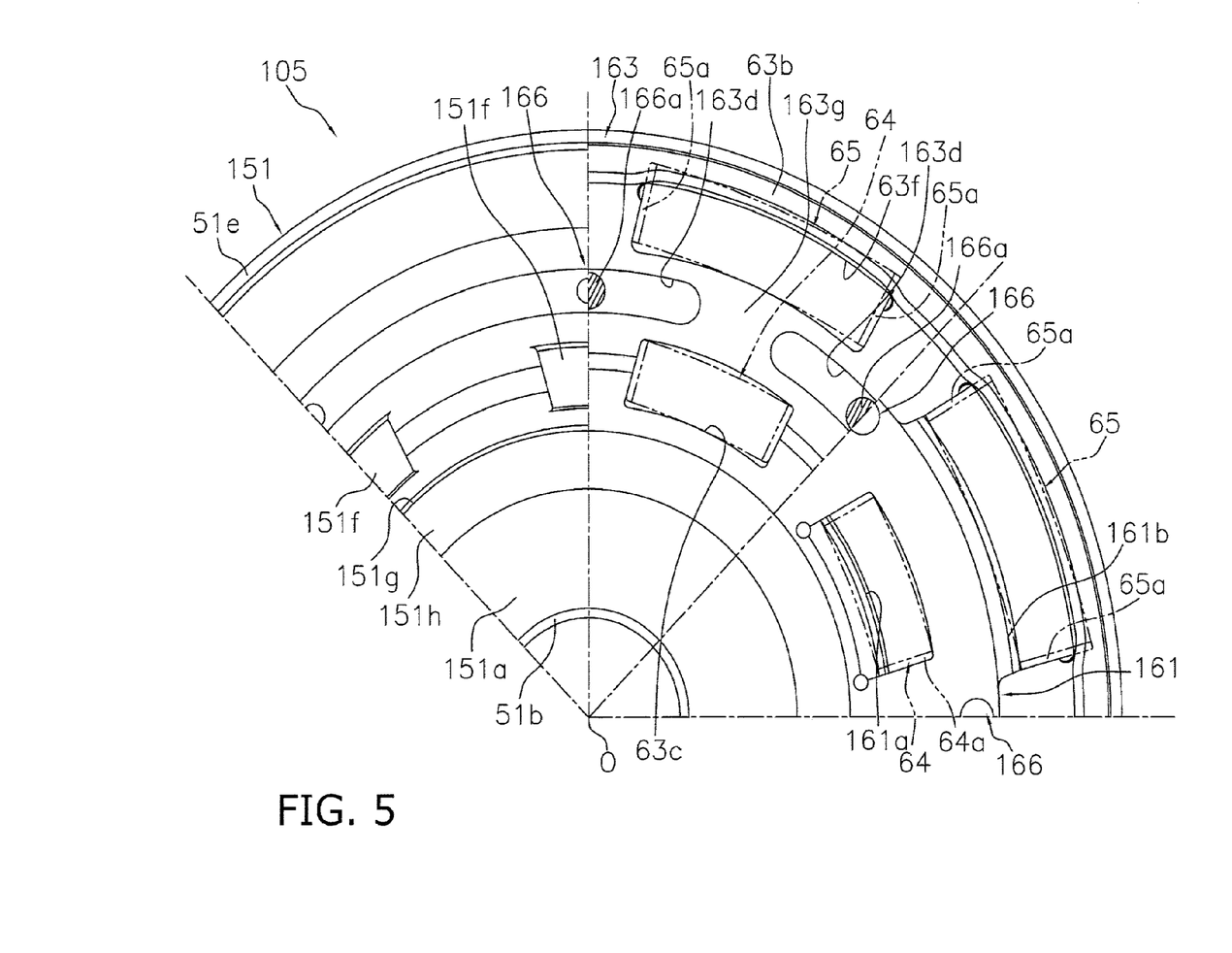
FIG. 5 is a partial elevational view of the lockup device of the second embodiment.

As shown in FIGS. 4 and 5, the lockup device 105 mainly includes a piston 151 and a damper mechanism 106. The damper mechanism 106 has a first plate 161, an intermediate plate 163, first springs 64, second springs 65, and pins 166.

The above-mentioned second plate 62 is omitted from this lockup device 105. More specifically, the first plate 161 is fixed to the piston 151 by a plurality of pins 166. The intermediate plate 163 is disposed in the axial direction between the first plate 161 and the piston 151.

The piston 151 has a piston main body 151a and an outer peripheral cylindrical component 51e. A plurality of protrusions 151f protruding inward in the radial direction is formed on the piston main body 151a. The protrusions 151f are disposed at an equal pitch in the rotation direction. The first springs 64 are disposed in the rotation direction between the adjacent protrusions 151f. The protrusions 151f are able to come into contact with the first spring seats 64a of the first springs 64 in the rotation direction.

The first plate 161 has first accommodation components 161a for supporting the first springs 64, and inner peripheral support components 161b for supporting the second springs 65. The edges of the first accommodation components 161a in the rotation direction are able to come into contact with the first spring seats 64a of the first springs 64 in the rotation direction. Thus, the first springs 64 are supported by the protrusions 151f and the first accommodation components 161a so as to be elastically deformable in the rotation direction.

The pins 166 each have an intermediate component 166a sandwiched in the axial direction between the piston 151 and the first plate 161. This maintains a gap in the axial direction between the piston 151 and the first plate 161.

The intermediate plate 163 has an annular intermediate plate main body 63a and an outer peripheral support component 63b. A plurality of arc-shaped slots 163d that extend in the rotation direction and a plurality of openings 63c are formed in the intermediate plate main body 63a. The second springs 65 are supported by the outer peripheral support component 63b and the inner peripheral support components 161b so as to be elastically deformable in the rotation direction.

The first intermediate components 166a of the pins 166 are inserted in the slots 163d. Unlike the above-mentioned slots 63d, the slots 163d constitute a stopper mechanism. More specifically, a pair of contact components 163g formed at both ends of the slots 163d in the rotation direction is able to come into contact with the pins 166 in the rotation direction. Thus, the contact components 163g and the pins 166 constitute a stopper mechanism. Since the radial dimension of the slots 163d is greater than the diameter of the intermediate components 166a of the pins 166, the intermediate components 166a do not touch the edges of the slots 163d in the radial direction.

The intermediate plate 163 is supported in the radial direction by the piston 151. More specifically, a support component 151h that supports the inner peripheral part 163j of the intermediate plate 163 in the radial direction is formed on the piston main body 151a of the piston 151. The support component 151h has a support face 151g that slides with the inner peripheral face of the inner peripheral part 163j. The size of the support face 151g in the axial direction is determined so that if the intermediate plate 163 should move in the axial direction between the first plate 161 and the piston 151, the intermediate plate 163 will not fall out from the support component 151h.

Features

The lockup device 105 has the following features.

(1) With the lockup device 105, just as with the above-mentioned lockup device 5, torque is transmitted to the turbine 4 from the second springs 65 disposed to the outside in the radial direction of the first springs 64. Therefore, compared to a configuration in which the driven plate 68 is fixed in the interior of the turbine 4, the size of the lockup device 105 can be reduced in the axial direction. This makes it possible for the lockup device 105 to be more compact.

(2) With the lockup device 105, since the second plate 62 used in the above-mentioned lockup device 5 is omitted, fewer parts are required than with the lockup device 5 or with a conventional lockup device. That is, the structure is simpler.

(3) With the lockup device 105, since the intermediate plate 163 is directly supported in the radial direction by the piston 151, there is no need for the second pins 67 in the lockup device 105. This means that fewer parts are required, so the structure can be simpler.

Other Embodiments

The specific constitution of the present invention is not limited to or by the above embodiments, and various modifications and improvements are possible without departing from the gist of the invention.

(1) In the first embodiment above, the intermediate plate 63 was supported in the radial direction by the second pins 67, but the intermediate plate 63 may instead be supported in the radial direction by the first pins 66, for example.

Also, in the second embodiment above, the intermediate plate 163 was supported in the radial direction by the piston 151, but the intermediate plate 163 may instead be supported in the radial direction by the pins 166, for example. In this case, there is no need to provide the support component 151h to the piston 151, so the structure can be simpler.

(2) In the first embodiment above, the inner peripheral parts of the first plate 61 and the second plate 62 were linked by the second pins 67, but the second pins 67 may be omitted. In this case, the stopper function for the intermediate plate 63 will have to be realized by the first pins 66, but even fewer parts are required, and the structure can be further simplified.

(3) In the first and second embodiments above, the damper mechanisms 6 and 106 had a single-stage characteristic, but these damper mechanisms may instead have two-, three-, or other such multi-stage characteristics.

(4) In the above embodiments, a torque converter was described as an example of a fluid-type torque transmission device. However, the device in which the lockup devices 5 and 105 are installed is not limited to a torque converter, and may instead be a fluid coupling, for example.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a fluid-type torque transmission device equipped with the present invention. Accordingly, these terms, as utilized to describe the present invention should be interpreted relative to a fluid-type torque transmission device equipped with the present invention as used in the normal operating position. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A lockup device for a fluid-type torque transmission device used in the fluid-type torque transmission device and disposed to transmit torque between a front cover and a turbine, comprising:
   a piston being provided movably in an axial direction and rotatably with respect to the front cover, the piston being configured to be connected to the front cover in order to transmit the torque from the front cover to the piston;
   a first plate being fixed to the piston in order to transmit the torque from the piston to the first plate;
   an intermediate plate being provided to be rotatable with respect to the piston within a specific angular range;
   a first elastic member being supported by the first plate to be elastically deformable in a rotation direction, the first elastic member being configured to transmit the torque from the first plate to the first elastic member and from the first elastic member to the intermediate plate;
   a second elastic member being disposed radially outside the first elastic member, the second elastic member being arranged and configured to act in series with the first elastic member via the intermediate plate, the second elastic member being supported by the intermediate plate to be elastically deformable in the rotation direction, the second elastic member being configured to transmit the torque from the intermediate plate to the second elastic member;
   a driven member having a prong being configured to contact an end of the second elastic member, and being fixed to the outer peripheral part of the turbine, the driven member being configured to transmit the torque from the second elastic member to the driven member;
   a first fixing member disposed radially outside the first elastic member, the first fixing member disposed to fix the outer peripheral part of the first plate to the piston; and
   a second plate disposed in the axial direction between the piston and the intermediate plate, and the second plate is fixed to the piston,
   the first elastic member being supported by the first and second plates to be elastically deformable in the rotation direction.

2. The lockup device for a fluid-type torque transmission device according to claim 1, further comprising
   a second fixing member disposed radially inside the first elastic member, and the second fixing member links the first and second plates.

3. The lockup device for a fluid-type torque transmission device according to claim 2,
   wherein the intermediate plate has a pair of contact components, the contact components are portions configured to contact the second fixing member in the rotation direction and limit the rotational angle of the intermediate plate with respect to the piston to within the specific angular range.

4. The lockup device for a fluid-type torque transmission device according to claim 3,
   wherein the intermediate plate is supported in the radial direction by the first plate via the second fixing member.

5. The lockup device for a fluid-type torque transmission device according to claim 3,
   wherein the intermediate plate is supported in the radial direction by contacting the piston.

6. The lockup device for a fluid-type torque transmission device according to claim 1,
   wherein the intermediate plate is supported in the radial direction by contacting the piston.

7. A lockup device for a fluid-type torque transmission device used in the fluid-type torque transmission device and disposed to transmit torque between a front cover and a turbine, comprising:
   a piston being provided movably in an axial direction and rotatably with respect to the front cover, the piston being configured to be connected to the front cover in order to transmit the torque from the front cover to the piston;
   a first plate being fixed to the piston in order to transmit the torque from the piston to the first plate;
   an intermediate plate being provided to be rotatable with respect to the piston within a specific angular range;
   a first elastic member being supported by the first plate to be elastically deformable in a rotation direction, the first elastic member being configured to transmit the torque from the first plate to the first elastic member and from the first elastic member to the intermediate plate;
   a second elastic member being disposed radially outside the first elastic member, the second elastic member being arranged and configured to act in series with the first elastic member via the intermediate plate, the second elastic member being supported by the intermediate plate to be elastically deformable in the rotation direction, the second elastic member being configured to transmit the torque from the intermediate plate to the second elastic member;
   a driven member having a prong being configured to contact an end of the second elastic member, and being fixed to the outer peripheral part of the turbine, the driven member being configured to transmit the torque from the second elastic member to the driven member; and
   a second plate disposed in the axial direction between the piston and the intermediate plate, the second plate being fixed to the piston,
   the first elastic member being supported by the first and second plates to be elastically deformable in the rotation direction.

8. The lockup device for a fluid-type torque transmission device according to claim 7, further comprising
   a second fixing member disposed radially inside the first elastic member, and the second fixing member links the first and second plates.

9. The lockup device for a fluid-type torque transmission device according to claim 8,
   wherein the intermediate plate has a pair of contact components, the contact components are portions configured to contact the second fixing member in the rotation direction and limit the rotational angle of the intermediate plate with respect to the piston to within the specific angular range.

10. The lockup device for a fluid-type torque transmission device according to claim 9,
    wherein the intermediate plate is supported in the radial direction by the first plate via the second fixing member.

11. The lockup device for a fluid-type torque transmission device according to claim 9,
    wherein the intermediate plate is supported in the radial direction by contacting the piston.

12. A fluid-type torque transmission device for transmitting torque outputted from an engine to a transmission, comprising:
    a front cover being configured to receive torque;
    an impeller being fixed to the front cover and forming a fluid chamber filled with a hydraulic fluid with the front cover;
    a turbine being disposed in the fluid chamber; and
    a lockup device, the lockup device including a piston being provided movably in an axial direction and rotatably with respect to the front cover, the piston being configured to be connected to the front cover in order to transmit the torque from the front cover, a first plate being fixed to the piston in order to transmit the torque from the piston to the first plate, an intermediate plate being provided to be rotatable with respect to the piston within a specific angular range, a first elastic member being supported by the first plate to be elastically deformable in a rotation direction, the first elastic member being configured to transmit the toque from the first plate to the first elastic member from the first elastic member to the intermediate plate, a second elastic member being disposed radially outside the first elastic member, the second elastic member being arranged and configured to act in series with the first elastic member via the intermediate plate, and the second elastic member being supported by the intermediate plate to be elastically deformable in the rotation direction, the second elastic member being configured to transmit the toque from the intermediate plate to the second elastic member, and a driven member having a prong being configured to contact an end of the second elastic member, and being fixed to the outer peripheral part of the turbine, the driven member being configured to transmit the torque from the second elastic member to the driven member, a first fixing member disposed radially outside the first elastic member, the first fixing member disposed to fix the outer peripheral part of the first plate to the piston, a second plate disposed in the axial direction between the piston and the intermediate plate, the second plate being fixed to the piston, the first elastic member being supported by the first and second plates to be elastically deformable in the rotation direction.

13. The fluid-type torque transmission device according to claim 12, wherein the lockup device further includes a second fixing member disposed radially inside the first elastic member, and the second fixing member links the first and second plates.

14. The fluid-type torque transmission device according to claim 13, wherein the intermediate plate has a pair of contact components, the contact components are portions configured to contact the second fixing member in the rotation direction and limit the rotational angle of the intermediate plate with respect to the piston to within the specific angular range.

15. The fluid-type torque transmission device according to claim 14, wherein the intermediate plate is supported in the radial direction by the first plate via the second fixing member.

16. The fluid-type torque transmission device according to claim 12, wherein the intermediate plate is supported in the radial direction by contacting the piston.

* * * * *